United States Patent
Quan et al.

(10) Patent No.: US 11,701,621 B2
(45) Date of Patent: Jul. 18, 2023

(54) METHOD FOR DIRECTLY GROWING ULTRATHIN POROUS GRAPHENE SEPARATION MEMBRANE

(71) Applicant: DALIAN UNIVERSITY OF TECHNOLOGY, Dalian (CN)

(72) Inventors: Xie Quan, Dalian (CN); Gaoliang Wei, Dalian (CN); Shuo Chen, Dalian (CN); Hongtao Yu, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 1079 days.

(21) Appl. No.: 16/325,168

(22) PCT Filed: Jun. 2, 2017

(86) PCT No.: PCT/CN2017/086957
§ 371 (c)(1),
(2) Date: Feb. 12, 2019

(87) PCT Pub. No.: WO2018/218644
PCT Pub. Date: Dec. 6, 2018

(65) Prior Publication Data
US 2019/0176094 A1    Jun. 13, 2019

(51) Int. Cl.
*B01D 67/00* (2006.01)
*B01D 71/02* (2006.01)
(Continued)

(52) U.S. Cl.
CPC ..... *B01D 67/0062* (2013.01); *B01D 67/0067* (2013.01); *B01D 69/02* (2013.01);
(Continued)

(58) Field of Classification Search
CPC .............. C01B 32/184; C01B 2204/00; C01B 2204/02; C01B 2204/04; B01D 67/0067
(Continued)

(56) References Cited

FOREIGN PATENT DOCUMENTS

| CN | 104028111 A | 9/2014 |
| CN | 104495808 A | 4/2015 |

(Continued)

OTHER PUBLICATIONS

Gaoliang Wei et al, ACS Nano 11(2017) 1920-1926. (Year: 2017).*

(Continued)

*Primary Examiner* — Tabassom Tadayyon Eslami
(74) *Attorney, Agent, or Firm* — Muncy, Geissler, Olds & Lowe, P.C.

(57) ABSTRACT

The invention, belonging to the field of membrane technology, presents a method for the direct growth of ultrathin porous graphene separation membranes. Etching agent, organic solvent and polymer are coated on metal foil, and then they are calcined at high temperature in absence of oxygen; after removal of metal substrate and reaction products, single-layered or multi-layered porous graphene membranes are obtained. Alternatively, the dispersion or solution of etching agent is coated on metal foil, on which a polymer film is then overlaid. The obtained sample is subsequently calcined at high temperature in absence of oxygen; after removal of metal substrate and reaction products, single-layered or multi-layered porous graphene membranes are obtained. The method involved in this invention is simple and highly efficient, and allows direct growth of ultrathin porous graphene separation membranes, without needing expensive apparatuses, chemicals and graphene raw material. Additionally, the graphene membranes prepared with this method have controlled pore size, ultrahigh water flux and strong resistance to irreversible fouling.

1 Claim, 2 Drawing Sheets

(51) Int. Cl.
*B01D 69/12* (2006.01)
*C01B 32/184* (2017.01)
*B01D 69/02* (2006.01)

(52) U.S. Cl.
CPC ......... *B01D 69/122* (2013.01); *B01D 71/021* (2013.01); *C01B 32/184* (2017.08); *B01D 67/0011* (2013.01); *B01D 2325/04* (2013.01); *C01B 2204/02* (2013.01); *C01B 2204/04* (2013.01)

(58) Field of Classification Search
USPC .................................................. 427/227, 228
See application file for complete search history.

(56) References Cited

FOREIGN PATENT DOCUMENTS

| CN | 104538209 A | 4/2015 |
|---|---|---|
| CN | 104649253 A | 5/2015 |

OTHER PUBLICATIONS

ACS Nano 11, 2, 1920-1926 (Year: 2017).*
Wei, Gaoliang et al. "Superpermeable Atomic-Thin Graphene Membranes with High Selectivity"; American Chemical Society, Nana; Feb. 7, 2017; vol. 11, No. 2, pp. 1920-1926 (abstract only) (XP 055549351).

* cited by examiner

METHOD FOR DIRECTLY GROWING ULTRATHIN POROUS GRAPHENE SEPARATION MEMBRANE

TECHNICAL FIELD

The invention belongs to the field of membrane technology, relating to a method for the direct growth of ultrathin porous graphene separation membranes.

BACKGROUND

Membrane technology has found wide applications in diverse areas ranging from food industry, medical engineering, bioengineering and water desalination to wastewater treatment, and has thus become one of the most important separation technologies. The permeability for water is an essential intrinsic attribute of membranes. Higher permeability usually contributes to higher efficiency and lower cost in a membrane-based separation process. According to the Hagen-Poiseuille equation ($J=\varepsilon\pi r2\Delta p/(8\mu\delta\tau)$), the flux (J) of a ultrafiltration or microfiltration membrane is inversely proportional to its thickness ($\mu$) and the tortuosity ($\tau$) of its pore channels. Therefore, it is expected that the membrane with ultrathin structure and straight pore channels spanning its whole thickness will have a permeability orders of magnitude higher than that of conventional membranes.

Graphene, a typical two-dimensional material with a thickness of only one atomic layer of sp2 carbon atoms, is the thinnest and strongest material at present. Experimental investigations and theoretical prediction model have confirmed that a single-layered or few-layered graphene membrane can afford an amazing permeability with diminished hydrodynamic resistance.

As far as we know, there are only two papers (K. Celebi, J. Buchheim, R. M. Wyss, A. Droudian, P. Gasser, I. Shorubalko, J.-I. Kye, C. Lee, H. G. Park. Ultimate permeation across atomically thin porous graphene. Science 2014, 344, 289-292; G. L. Wei, X. Quan, S. Chen, H. T. Yu. Superpermeable atomic-thin graphene membranes with high selectivity. ACS Nano, 2017, 11(2), 1920-1926) that have investigated the transport of water or gas molecules across porous graphene ultrafiltration membranes. In Celebi's work, photolithography, reactive ion etching, Ga- and He-based FIB drilling have to been used, which complicates their preparation. Wei's work needs two-time high-temperature processes, which improves the energy consumption. In consideration of excellent performance of graphene membranes, it is therefore very important to exploit their simple, low-cost and large-area preparation method.

SUMMARY

In order to address the problems facing the current preparation method of porous graphene ultrafiltration membranes, for example, high cost, low efficiency and tedious process, this invention puts forward a novel strategy for the direct growth of ultrathin porous graphene separation membranes. This strategy is very simple and energy-efficient, and can be competent for their large-area preparation.

This invention is based on thermal conversion of polymer into graphene and carbothermic reaction. At high temperature, carbon atoms derived from pyrolysis of polymer can rearrange on metal foil to form graphene. At the same time, etching agent can react with carbon atoms of graphene around them to produce pores. As a result, porous graphene can be obtained.

The direct growth of ultrathin porous graphene membranes involved in this invention typically contains two steps as follows:

(1) A mixture of etching agent, organic solvent A and polymer is coated on metal foil, and then they are calcined at high temperature in absence of oxygen. The mass ratio of etching agent to polymer to organic solvent A is 1:0.5-50:100-1000. Alternatively, the dispersion or solution of etching agent is coated on metal foil, on which a polymer film is then overlaid. The obtained sample is subsequently calcined at high temperature in absence of oxygen. The mass ratio of etching agent to polymer to organic solvent B or dispersion B is 1:0.5-50:100-1000. The calcination is performed at 400-1200° C. for 0.17-4 hours.

Here, organic solvent B or dispersion B is used for dissolution or dispersion of etching agent.

(2) After removal of metal substrate and reaction products, ultrathin porous graphene membranes are obtained. The membranes consist of single-layered, double-layered or multi-layered graphene.

The etching agent is polyoxometalate or metal nitrates or metal oxide, or a mixture of several kinds of them. Polyoxometalate is $KMnO_4$ or $NaMnO_4$ or $LiMnO_4$ or $K_2MnO_4$ or $Li_2MnO_4$ or $Na_2MnO_4$ or $K_2Cr_2O_7$ or $Na_2Cr_2O_7$ or $Li_2Cr_2O_7$ or $K_2CrO_4$ or $Na_2CrO_4$ or $Li_2CrO_4$ or $Li_2MoO_4$ or $K_2MoO_4$ or $Na_2MoO_4$, or a mixture of several kinds of them; Metal nitrate is $Cu(NO_3)_2$ or $Fe(NO_3)_3$ or $Co(NO_3)_2$ or $Mn(NO_3)_2$ or $Cd(NO_3)_2$ or $Cr(NO_3)_3$, or a mixture of several kinds of them, preferably $Cu(NO_3)_2$ or $Fe(NO_3)_3$; Metal oxide is $CuO$ or $Cu_2O$ or $Fe_3O_4$ or $Fe_2O_3$ or $Al_2O_3$ or $CrO_2$ or $TiO_2$ or $CdO$ or $SnO_2$, or a mixture of several kinds of them.

The polymer is polyvinyl butyral (PVB) or/and polymethylmethacrylate (PMMA).

The organic solvent A is methanol or ethanol or isopropyl alcohol or acetone or chloroform, or a mixture of several kinds of them. The organic solvent B or dispersion is ethanol or/and water.

The metal foil is copper foil or nickel foil.

The oxygen-free condition is inert gas protection or vacuum. Inert gas is $N_2$ or Ar or He or Ne or Kr or Xe or Rn, or a mixture of several kinds of them, optimally $N_2$ or Ar; Vacuum pressure is not higher than 50 Pa.

The mass concentration of etching agent solution or dispersion is 0.1%-20%.

The removal of metal foil and reaction products is achieved by floating the sample on the surface of 0.5~5 mol/L $FeCl_3$/0.1~1 mol/L HCl solution or 0.1~10 wt % $(NH_4)_2S_2O_8$ solution.

The steps for the preparation of the solution or dispersion of etching agent, polymer and organic solvent A are shown as follows:

Under stirring, PVB or/and PMMA is dissolved in corresponding organic solvent to form a homogeneous solution, then polyoxometalate or/and metal nitrates is dissolved in the solution. Alternatively, PVB or/and PMMA is dissolved in corresponding organic solvent under stirring to form a homogeneous solution, then metal oxide is dispersed in the solution under ultrasonic assistance.

The coating strategy is preferably spin-coating or dip-coating.

The steps for the preparation of the solution or dispersion of etching agent and solvent B are shown as follows: under assistance of ultrasonic and stirring, etching agent is dissolved or dispersed in solvent B. Solvent B is preferably water or/and ethanol.

The drying method of sample is preferably ambient drying.

The polymer film is PVB film or PMMA film or polyethylene (PE) film or polytetrafluoroethylene (PTFE) film.

Advantageous Effects of the Invention

The method involved in this invention is simple and highly efficient without needing expensive apparatuses, chemicals and graphene raw material. Additionally, graphene membranes prepared with this method have controlled pore size, ultrahigh water flux and strong resistance to irreversible fouling.

DETAILED DESCRIPTION

Some examples are given to further illustrate the detail preparation process of porous graphene membranes, and it should be emphasized that this invention is not confined to these examples as follows.

Example 1

Typically, PMMA and corresponding amount of Cu $(NO_3)_2 \cdot 3H_2O$ are successively dissolved into acetone to obtain a solution in which the mass ratio of $Cu(NO_3)_2$ to PMMA to acetone is 1:5:200. Subsequently, 10 µL of the solution is spin-coated at 1500 r/min on a 1 cm×1 cm Cu foil, followed by natural drying to allow the evaporation of acetone. The Cu foil with a $Cu(NO_3)_2$/PMMA layer is then calcined at 800° C. for 1 h in a 400 sccm Ar flow at a total pressure of 100 Pa, followed by a another calcination at 1000° C. for 30 min in a 400 sccm Ar/10 sccm $H_2$ flow at the same total pressure of 100 Pa. After its cooling down to room temperature, the obtained sample is floated on the surface of 2.5 M $FeCl_3$/0.5 M HCl solution to remove Cu foil and reaction products. At last, the sample left on water surface is transferred on other substrates for filtration.

Figure 1:
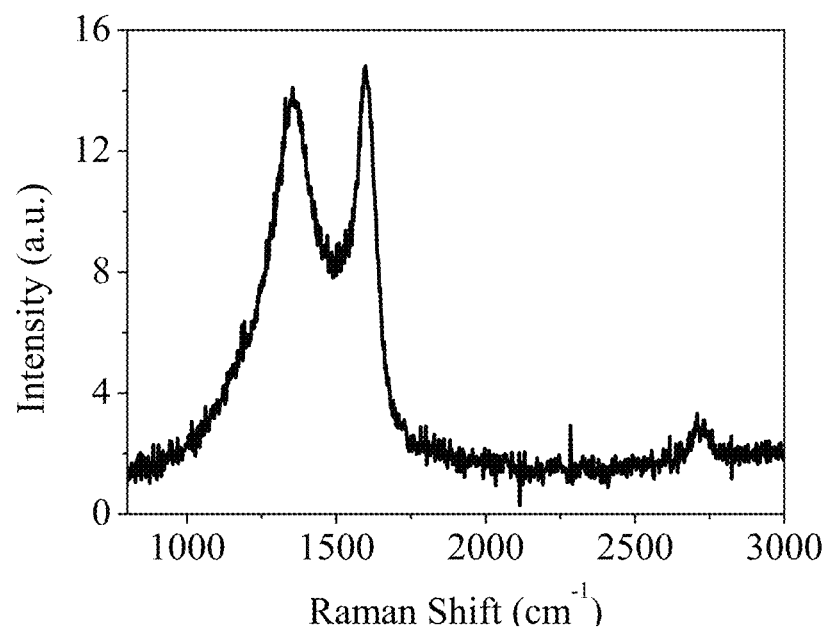
FIG. 1: The Raman spectrum of graphene membrane obtained from Example 1.

As shown in FIG. 1 revealing the Raman spectrum of the sample, two strong peaks centered at 1590 $cm^{-1}$ (G band) and 2684 $cm^{-1}$ (2D band), the typical characteristic peaks of graphene, can be obviously observed, which suggests that porous graphene is successfully obtained by thermal conversion of PMMA on Cu foil.

Figure 2:
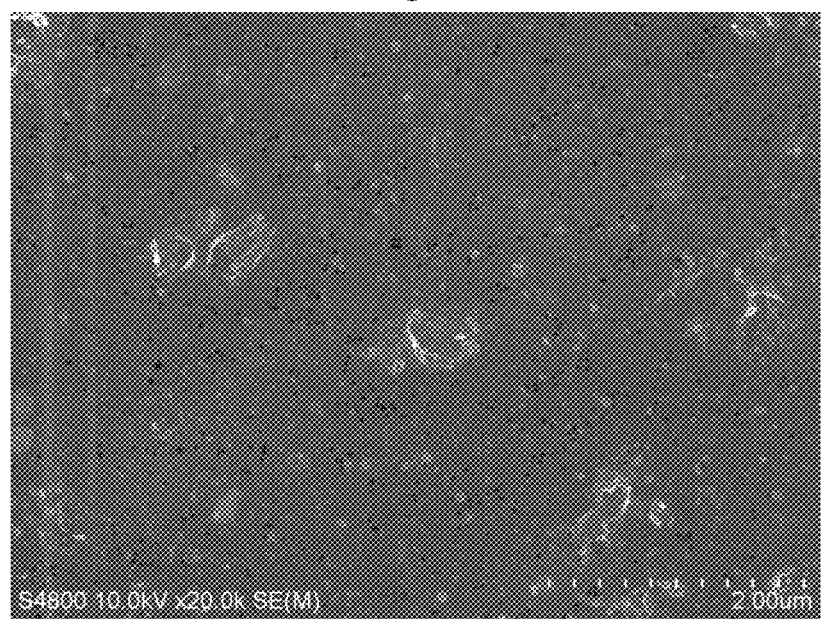
FIG. 2: The SEM image of graphene membrane obtained from Example 1.

In SEM image (FIG. 2), an abundance of pores can be clearly observed as black circular dots with an average size of 20 nm. Its water flux is measured to be 48000 L $m^{-2}$ $h^{-1}$ $bar^{-1}$.

Example 2

Based on the method shown in Example 1, a solution in which the mass ratio of $Cu(NO_3)_2$ to PMMA to acetone is 1:2.5:100 is prepared. Subsequently, 10 µL of the solution is spin-coated at 1500 r/min on a 1 cm×1 cm Cu foil, followed by natural drying to allow the evaporation of acetone. The Cu foil with a $Cu(NO_3)_2$/PMMA layer is then calcined at 800° C. for 1 h in a 400 sccm Ar flow at ambient pressure. After its cooling down to room temperature, the obtained sample is floated on the surface of 2.5 M $FeCl_3$/0.5 M HCl solution to remove Cu foil and reaction products. At last, the sample left on water surface is transferred on other substrate for filtration.

Figure 3:
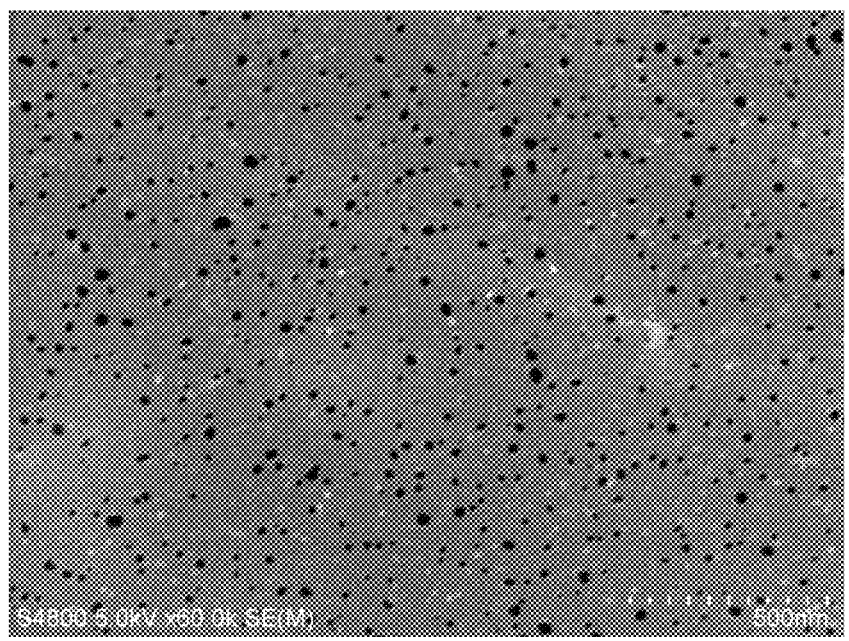
FIG. 3: The SEM image of graphene membrane obtained from Example 2.

A shown in FIG. 3, porous graphene membrane is successfully obtained with an average size of 35 nm. Its water flux is measured to be 105000 L $m^{-2}$ $h^{-1}$ $bar^{-1}$.

Example 3

Typically, 0.1 g $Fe(NO_3)_3 \cdot 9H_2O$ and 2.5 g PVB are dissolved in 100 g ethanol to obtain a homogeneous solution. Subsequently, 20 µL of the solution is spin-coated at 1000 r/min on a 2 cm×2 cm Ni foil, followed by natural drying to allow the evaporation of ethanol. The Ni foil with a $Fe(NO_3)_3$/PVB layer is then calcined at 800° C. for 1 h in a 400 sccm Ar flow at a total pressure of 50 Pa, followed by a another calcination at 800° C. for 30 min in a 400 sccm Ar/10 sccm $H_2$ flow at the same total pressure of 50 Pa. After its cooling down to room temperature, the obtained sample is floated on the surface of 2 wt % $(NH_4)_2S_2O_8$ solution to remove Cu foil and reaction products. At last, the sample left on water surface is transferred on other substrates for filtration.

Example 4

Based on the method shown in Example 1, a solution in which the mass ratio of $Cu(NO_3)_2$ to PMMA to acetone is 1:2.5:100 is prepared. Then, a 10 cm×5 cm Cu foil is immersed in the solution for 1 min, and subsequently pulled out at 1 mm/min. The Cu foil with a $Cu(NO_3)_2$/PMMA layer is then calcined at 1000° C. for 10 min in a 400 sccm Ar flow at ambient pressure, followed by a another calcination at 1000° C. for 30 min in a 400 sccm Ar/10 sccm $H_2$ flow at ambient pressure. After its cooling down to room temperature, the obtained sample is then covered with a layer of 15 wt % polyethersulfone (PES)/N,N-Dimethylformamide solution using a scraper. The sample obtained is rapidly immersed in water. After removal of Cu foil and reaction products with 2.5 M $FeCl_3$/0.5 M HCl solution, the porous graphene/PES composite membrane is obtained.

Example 5

Typically, 1 g $Fe(NO_3)_3 \cdot 9H_2O$ is dissolved in 50 g ethanol to obtain a homogeneous solution. The solution is dropped on a 20 cm×10 cm Cu foil to form a liquid film, on which domestic preservative film is then overlaid. They are subsequently hot-pressed into a three-layered structure. The sample obtained is then calcined at 900° C. for 30 min in a 800 sccm Ar flow at ambient pressure. After its cooling down to room temperature, the obtained sample is then covered with a layer of 15 wt % polyvinylidene fluoride (PVDF)/polyvinyl pyrrolidone/N,N-Dimethylformamide solution using a scraper. The sample obtained is rapidly immersed in water. After removal of Cu foil and reaction products with 2.5 M $FeCl_3$/0.5 M HCl solution, the porous graphene/PVDF composite membrane is obtained.

Figure 4:
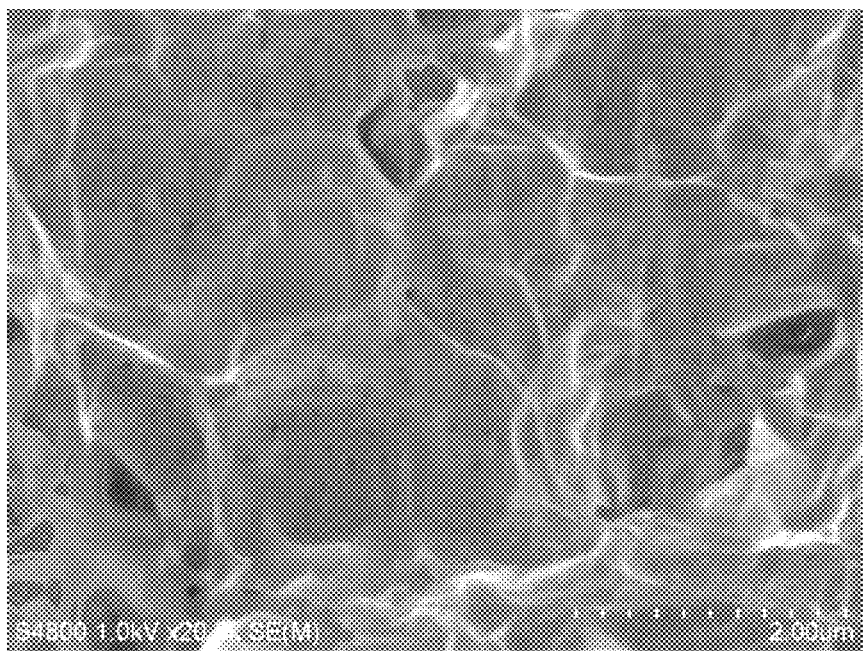
FIG. 4: The SEM image of graphene membrane obtained from Example 5.

A shown in FIG. 4, porous graphene/PVDF composite membrane is successfully obtained with an average pore size of approximately 50 nm.

The invention claimed is:

1. A method for direct growth of porous graphene separation membrane on a metal foil, comprising:
    (1) directly coating mixture of an etching agent, an organic solvent A and a polymer on a metal foil, and calcining the mixture and the metal foil at high temperature in absence of oxygen; wherein a mass ratio of the etching agent to the polymer to the organic solvent A is 1:0.5-50:100-1000,
        alternatively, coating a dispersion or solution of the etching agent on a metal foil, on which a polymer film is overlaid; calcining the obtained metal foil at high temperature in absence of oxygen; wherein a mass ratio of the etching agent to the polymer to a solvent B or a dispersion B is 1:0.5-50:100-1000; the calcination is performed at 400-1200° C. for 0.17-4 hours;
    wherein the solvent B or the dispersion B is used for dissolution or dispersion of the etching agent,
    wherein the etching agent is polyoxometalate, metal nitrates, metal oxide, or a mixture of thereof, and a mass concentration of the etching agent solution or dispersion is 0.1%-20%,
    wherein the polymer is polyvinyl butyral or/and polymethylmethacrylate,
    wherein the organic solvent A is methanol, ethanol, isopropyl alcohol, acetone, chloroform, or a mixture thereof, the solvent B or the dispersion B is ethanol or/and water,
    wherein the metal foil is copper foil or nickel foil, and
    wherein the oxygen-free condition is inert gas protection or vacuum,
    (2) removing the metal foil and reaction products to obtain the porous graphene separation membranes; wherein the porous graphene separation membranes consist of single-layered, double-layered or multi-layered graphene.

* * * * *